United States Patent [19]

Knutson

[11] 4,127,835

[45] Nov. 28, 1978

[54] ELECTROMECHANICAL FORCE MOTOR

[75] Inventor: Dale A. Knutson, Oconomowoc, Wis.

[73] Assignee: Dynex/Rivett Inc., Pewaukee, Wis.

[21] Appl. No.: 813,396

[22] Filed: Jul. 6, 1977

[51] Int. Cl.[2] ........................ H01F 7/16; H02K 33/16

[52] U.S. Cl. ........................................ 335/266; 310/30; 335/229; 335/255

[58] Field of Search ............... 337/266, 256, 253, 268, 337/229, 230, 234, 79, 81, 255, 236; 310/30, 14

[56] References Cited

U.S. PATENT DOCUMENTS

| | | | |
|---|---|---|---|
| 3,103,603 | 9/1963 | Reutter | 310/30 |
| 3,755,766 | 8/1973 | Read, Jr. | 335/236 |

OTHER PUBLICATIONS

IBM Technical Disclosure Bulletin, vol. 14, No. 11 (Apr. 72), Linear D.C. Motor.

*Primary Examiner*—Harold Broome
*Attorney, Agent, or Firm*—John J. Byrne; Edward E. Dyson

[57] ABSTRACT

An electromechanical force motor including an elongate magnetic casing which coaxially enhouses a magnetic armature. An annular electromagnetic coil surrounds the armature and is axially positioned between a pair of permanent magnets having axially directed poles. A magnetic pole is positioned at each end of the armature in a posture juxtaposed to but spaced from the ends of the armature to provide a magnetic flux gap between the armature and poles. A pushrod is connected to one end of the armature and projects outwardly from the casing to produce work upon excitation of the electromagnetic coil.

15 Claims, 7 Drawing Figures

FIG. 3
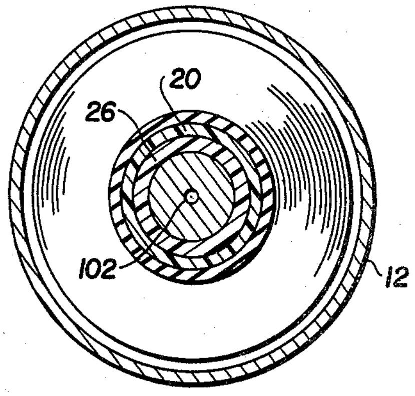
FIG. 4
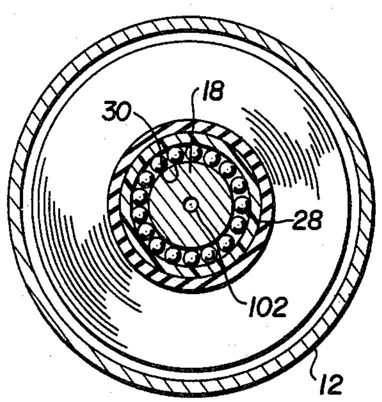
FIG. 5
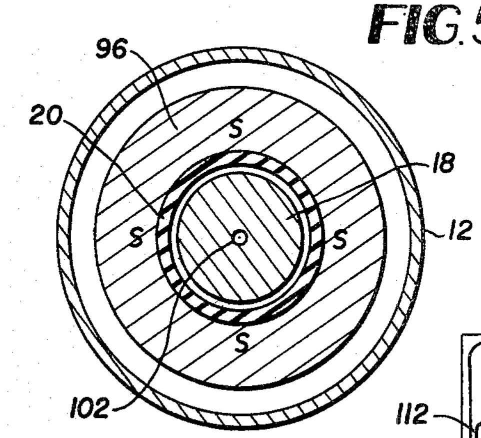
FIG. 6
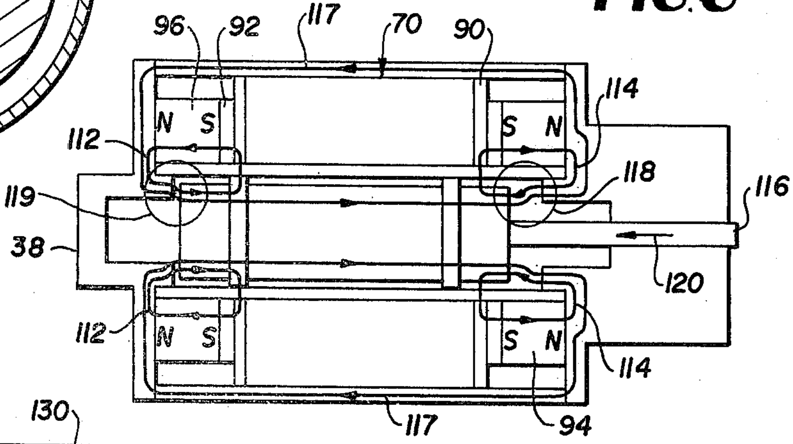
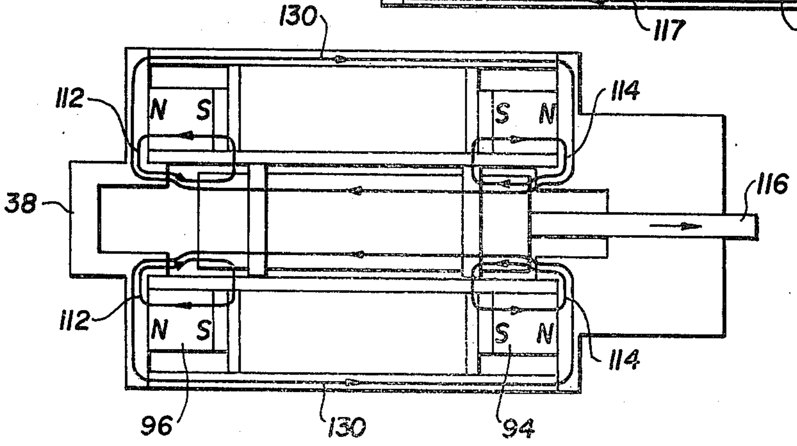
FIG. 7

ELECTROMECHANICAL FORCE MOTOR

BACKGROUND OF THE INVENTION

This invention relates to an electromechanical force motor. More particularly this invention relates to an electromechanical driver for hydraulic servoactuators or electrohydraulic flow control valves and the like.

In the past, linear motion electromagnetic devices have been known wherein an armature is surrounded at one end by an annular electromagnetic coil which in turn is encompassed by a concentric permanent magnet having axially directed poles. A pair of Belleville spring washers bias the armature in a first direction and overcome an attractive force exerted upon the armature by the permanent magnet. Upon application of current to the electromagnetic coil, however, the flux of the permanent magnet and electromagnet become additive and serve to overcome the spring bias and produce work through translation of the armature. Depending upon the springs selected, current applied or design of the magnetic members, such a device may be functionally designed for an off-on mode and vice versa, a minimum power mode, a maximum driving force mode, proportioned modes wherein the armature position is dependent upon the current in the electromagnet coil or where force output is made proportional to the input current in the electromagnet coil, and in a latching mode.

Although such electromagnetic devices have been utilized, the diameter of the unit perpendicular to the armature axis must be large to minimize flux leakage. This large unit diameter makes it difficult to place several devices adjacent to each other within a limited space. Additionally, the elements of the device are not symmetrically placed. Accordingly, changes in temperature, which can effect magnetic force output, may produce changes in operation of the unit.

Another previously known electromagnetic reciprocating device has been designed to overcome many of these disadvantages by employing a single electromagnet with a long axial length with respect to its diametrical dimensions and a concentric elongated permanent magnet having radially oriented poles. The permanent magnet provides two oppositely directed flux paths flowing from the center of the armature towards its ends and a pair of pole pieces and back through an external shell to the permanent magnet.

At least one difficulty, however, with such a modified design is that radial magnets require special fabrication and tend to provide a relatively weak flux path across the armature gaps.

Still further previously known force motor units have required specialized assembly techniques and when the unit was employed in a liquid immersed environment electrical lead wires to the assembly had to pass through hydraulically sealed electrical connections.

The difficulties suggested in the proceeding are not intended to be exhaustive, but rather are among many which may tend to reduce the effectiveness of prior electromagnetic force motor devices. Other noteworthy problems may also exist; however, those presented above should be sufficient to demonstrate that electromagnetic force motor devices appearing in the past will admit to worthwhile improvement.

In the above connection, it would be highly desirable to provide an electromechanical force motor which is symmetric while utilizing axially oriented permanent magnets. Additionally, it would be desirable to provide a force motor which eliminates costly and delicate centering springs while providing an accurate and low friction bearing arrangement for the armature. Further, it would be desirable to provide a force motor capable of operation in varying ambient environments without requiring costly sealing features in the force motor casing.

OBJECTS OF THE INVENTION

It is therefore a general object of the invention to provide a novel electromechanical force motor which will obviate or minimize prior difficulties while concomitantly providing desired features of the type previously described.

It is a particular object of the invention to provide a novel electromechanical force motor which is symmetric in design and may be power-driver in either direction.

It is another object of the invention to provide a novel electromechanical force motor which has a narrow body length while utilizing axially oriented permanent magnets.

It is yet another object of the invention to provide a novel electromechanical force motor which is symmetric and the armature thereof will be automatically centered upon deactivation of the electromagnetic coil.

It is still another object of the invention to provide a novel electromechanical force motor wherein delicate and costly bearing springs are eliminated.

It is a further object of the invention to provide a novel electromechanical force motor wherein the motor armature is coaxially supported within the unit for translation upon excitation of an electromagnetic driving coil.

It is yet a further object of the invention to provide a novel electromechanical force motor wherein the motor may be operated in various ambient environments without providing a special casing to seal the motor and electrical lead wires from the environment.

THE DRAWINGS

Other objects and advantages of the present invention will become apparent from the following detailed description of a preferred embodiment thereof taken in conjunction with the accompanying drawings, wherein:

FIG. 3 is a cross-sectional view taken along section line 3—3 of FIG. 2 and discloses the concentric relationship of an armature, a glide ring, a diamagnetic sleeve and an electromagnetic coil within a magnetic casing;

FIG. 4 is a cross-sectional view similar to the cross-sectional view depicted in FIG. 3 and discloses an alternate preferred embodiment of the invention wherein ball bearings replace the glide ring shown in FIG. 3;

FIG. 5 is a cross-sectional view taken along section line 5—5 in FIG. 3 and discloses an axial orientation of a permanent magnet which surrounds a central armature;

FIG. 6 is a schematic view wherein current within the electromagnetic coil produces an electromagnetic flux which acts in concert with the permanent magnetic flux imparted across the armature gap at the left end of the armature which pulls the armature and associated pushrod to the left as viewed in FIG. 6; and FIG. 7 is a schematic view wherein current within the electromagnetic coil produces an electromagnetic flux imparted across the armature gap at the right end of the armature which pulls the armature and associated pushrod to the right as viewed in FIG. 7.

DETAILED DESCRIPTION

Prior to describing a preferred embodiment of the present invention a brief note might be useful with regard to terminology to be used in connection with this application. As used in this application a "magnetic" material shall be deemed to mean and include paramagnetic and ferromagnetic substances which have positive susceptibility. Ferromagnetic substances are preferred, however, and include iron, nickel, cobalt, gadolinium, and some alloys. A "diamagnetic" material shall be deemed to mean substances where the susceptibility is negative and the relative permeability slightly less than 1; such substances include copper, silver, and bismuth.

Figure 1:
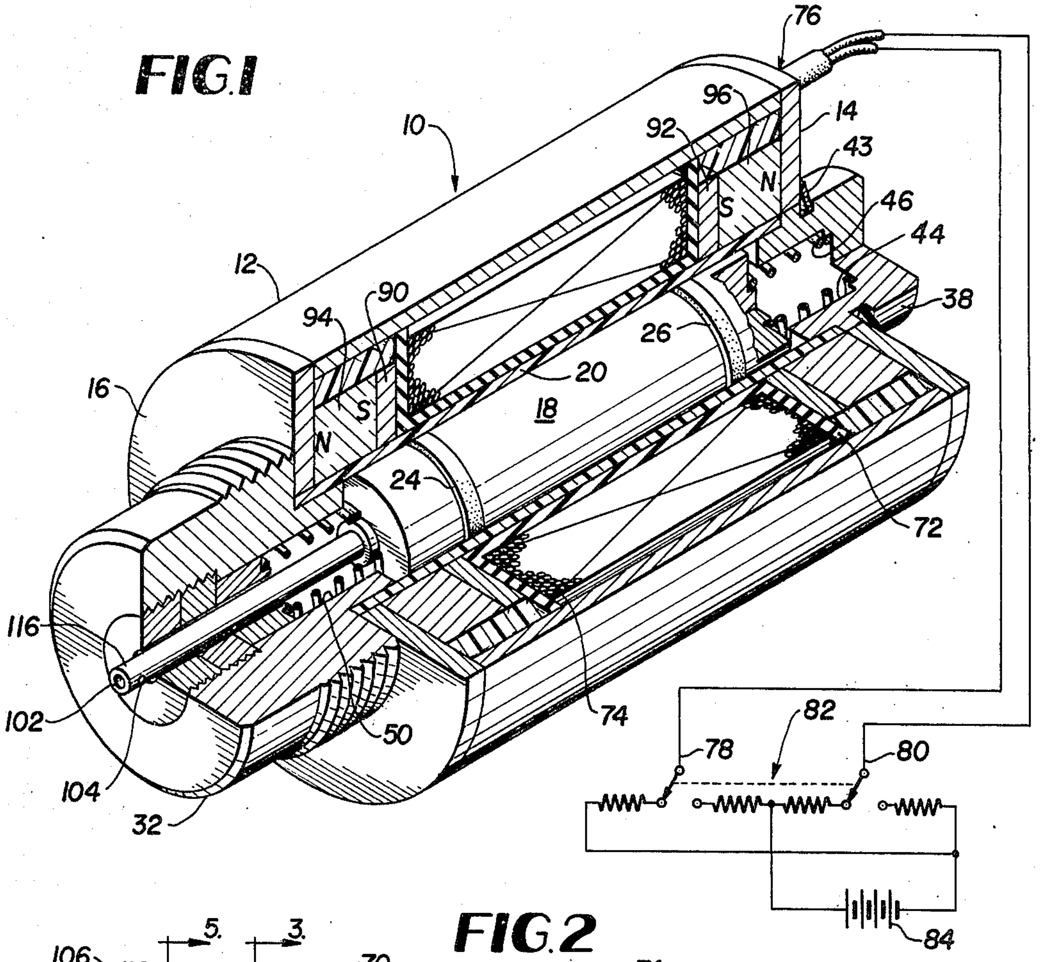
FIG. 1 is an axonometric view of a force motor in accordance with a presently preferred embodiment of the invention which is sectioned in one quadrant to disclose internal detail of the motor.
Figure 2:
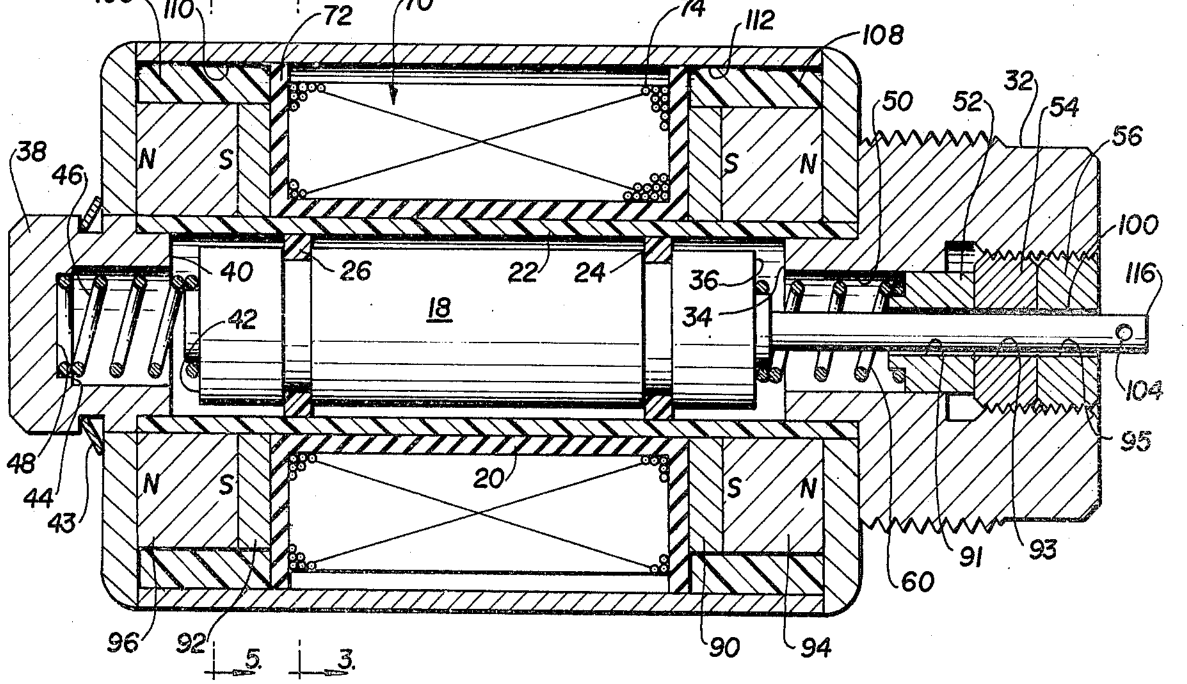
FIG. 2 is a cross-sectional side elevational view of the force motor and discloses a central magnetic armature surrounded by an electromagnetic coil and permanent magnets at each axial end of the electromagnetic coil.

Turning now to the drawings and particularly to FIGS. 1 and 2 thereof there will be seen an electromechanical force motor 10 in accordance with a preferred embodiment of the invention.

The force motor 10 includes an elongate cylindrical magnetic casing 12 which is closed at each end by end plates 14 and 16 respectively. A magnetic armature 18 comprising in substance a solid right cylinder is coaxially mounted within the casing 12 by a diamagnetic sleeve 20.

A small annular passage 22 is provided between the armature 18 and the sleeve 20 to eliminate frictional contact between the armature 18 and the sleeve 20 along its axial length. Bearing support is provided, however, between the two members by a first glide ring 24 positioned adjacent one end of the armature and a second glide ring 26 positioned adjacent the other end of the armature (note FIG. 3).

The glide rings 24 and 26 are each fabricated with a material having a low coefficient of friction such as polytetrafluoroethylene.

In an alternate preferred embodiment of the invention, note FIG. 4, the glide rings 24 and 26 are replaced by a plurality of ball bearings 28 which are received within a race 30 fashioned within the armature 18, such as shown in FIG. 4, or alternatively within the sleeve 20.

A first magnetic pole 32 is coaxially mounted at one end of the housing and has an annular pole face 34 which extends in a posture juxtaposed to but spaced from one end 36 of the armature 18. In a similar manner a second magnetic pole 38 is coaxially mounted at the other end of the housing and has an annular pole face 40 which extends in a posture juxtaposed to but spaced from the other end 42 of the armature 18.

The poles 32 and 38 are welded to the ends of sleeve 20 and thereby form an easily assembled unitized core structure. The end plates 14 and 16 and casing 12, with internal components, can all be facially slid onto the welded tube assembly and retained in place with a retaining ring 43.

The magnetic pole 38 is fashioned with a well 44 which operably receives a coil spring 46 for reaction between an end wall 48 of the well and end 42 of the armature. At the other end of the force motor a passage 50 is fashioned through the magnetic pole 32 and a bearing member 52 is held in position by a first threaded retainer 54 and a locking threaded retainer 56. Alternatively the retainer 54 may be welded in position. A coil spring 60 is positioned within the passage 50 and reacts between the bearing member 52 and the other end 36 of the armature 18.

The spring 46 at one end of the armature in cooperation with the spring 60 at the other end of the armature serves to axially bias the armature in a posture centrally located within the casing 12.

An electromagnetic coil 70 is coaxially mounted about the sleeve 20 and is axially centered within the casing 12. The coil 70 includes an annular bobbin 72 which carries a uniform wrapping of endless electrical wire 74 or the like which exits through a passage in end wall 14 as at 76. Due to the previously discussed unitized weldment of the poles 32 and 34 with tubular sleeve 20 it is unnecessary to hydraulically seal the electrical connectors passing through end wall 14.

The ends of the conductor 74 are joined to terminals 78 and 80 of a variable electrical controller 82. The controller 82 is connected to a conventional source of direct current 84. Accordingly actuation of the controller 82 in a posture depicted in FIG. 1 will induce electrons to flow through the conductor coil 70 in a first direction and actuation of the controller 82 in the opposite position will induce electrons to flow through the coil 70 in a second, reverse direction. The force on the armature 18, and thus its displacement, is proportional to the current flowing through the coil 70 as will be discussed more fully hereinafter.

Magnetic pole washers 90 and 92 are positioned at each axial end of the bobbin 72 and abut against a first annular permanent magnet 94 and a second annular permanent magnet 96 respectively. The pole washers are fashioned with an outside diameter approximately equal with an associated permanent magnet to insure that a flux path is established between working in gaps between the armature and pole pieces. The annular permanent magnets 94 and 96 are positioned within the casing such that like poles are positioned adjacent the opposite ends of the bobbin 72. Accordingly flux created by the permanent magnets will be supplemented at one end of the armature and opposed at the other end of the armature notwithstanding the direction of flux produced by the electromagnetic coil.

The bearing member 52 and retaining means 54 and 56 are each fashioned with an axial bore 91, 93 and 95 respectively which serves as a passageway for a push rod 96 which is connected to one end 36 of the armature 18 and extends exteriorly of the force motor casing to produce work.

An annular gap 100 is left between the outer perimeter of the push rod 116 and inner periphery of the axial bores 90–94. This axial passage permits ambient fluid to freely enter into and out of one end of the force motor. In a similar vein an axial bore 102 extends through the center of the push rod 116 and the armature 18 to provide fluid communication between the ambient environment and the other end of the force motor. A transverse aperture 104 extends radially through the outermost end of the push rod in order to facilitate entry of fluid into bore 102. With a provision for fluid entry at both ends of the subject force motor the system is balanced and variations in ambient fluid may be accommodated without requiring the casing to be sealed.

In order to secure the permanent magnets and electromagnetic coil in position a potting compound 106 and 108 is injected into cavities 110 and 112 respectively during assembly of the force motor unit.

Referring now to FIGS. 6 and 7 of the drawings the general operation of the subject electromagnetic force motor may be appreciated.

In FIG. 6 electron flow is induced in the electromagnetic coil 70 such that electromagnetic flux lines 117 are produced which add to the flux lines 112 of the permanent magnet 96. At the same time flux lines 117 oppose the flux lines 114 produced by the permanent magnet 94. With this position of the variable electrical controller 82 the air gap 119 between pole face 40 and armature end 42 is reduced while the air gap 118 at the opposite end of the armature 18 is increased. The difference between the flux densities in the two air gaps generates a force on the armature causing it to move against the centering spring forces. Accordingly the push rod 116 is directed toward the force motor in the direction of arrow 120.

In FIG. 7 the variable electrical controller 82 is thrown in the opposite mode and the electromagnetic flux lines 130 extend in an opposite direction and act in concert with the flux lines 114 produced by the permanent magnet 94. At the same time flux lines 130 oppose the flux lines 112 produced by the permanent magnet 96. The air gap between the pole face 34 and the armature end 36 will therefore decrease while the air gap between the pole face 40 and the armature face 42 will increase. In this mode the push rod 96 will be forced outwardly away from the force motor to produce work.

In both modes of operation the magnitude of the force on the armature 18, and thus its displacement, is proportional to the current flow through the coil 70.

In describing an electromagnetic force motor in accordance with a preferred embodiment of the invention, those skilled in the art will recognize several advantages which singularly distinguish the subject invention from previously known devices.

A particular advantage is the provision of an electromechanical force motor which is symmetric in design and may be power driven in either direction. The subject force motor casing is relatively elongated and slender while utilizing relatively inexpensive axially oriented annular permanent magnets.

Additionally compression springs at each end of the force motor serve to overcome the bias of the permanent magnets to position the armature in a central, neutral posture when the electromagnetic coil is not energized.

The glide rings or ball bearings of the invention provide a relatively frictionless bearing for the armature within the surrounding diamagnetic sleeve and eliminates a need for delicate bearing springs at the ends of the force motor housing.

Still further the axial bore through the push rod and armature as well as the gap around the push rod permits ambient fluid to freely enter the force motor casing.

Additionally the unitized central core provides for rapid and facile assembly and fluidically isolates the area surrounding the armature and permits lead wires of the coil to exit from the assembly without requiring hydraulically sealed electrical connections.

In describing the invention, reference has been made to a preferred embodiment. Those skilled in the art, however, and familiar with the disclosure of the subject invention, may recognize additions, deletions, modifications, substitutions and/or other changes which will fall within the purview of the invention as defined in the following claims.

What is claimed is:

1. An electromechanical force motor comprising:

an elongate magnetic casing;

a magnetic armature coaxially mounted for axial reciprocation within said elongate casing;

an annular electromagnetic coil coaxially mounted within said casing;

means connected to said electromagnetic coil for electrically exciting said coil;

a first annular permanent magnet means coaxially mounted within said casing and axially positioned at one end of said electromagnetic coil;

a first annular pole washer coaxially mounted within said casing between said electromagnetic coil and said first annular permanent magnet and being magnetically isolated from said elongate casing;

a second annular permanent magnet means coaxially mounted within said casing and axially positioned at the other end of said electromagnetic coil;

a second annular pole washer coaxially mounted within said casing between said electromagnetic coil and said second annular permanent magnet and being magnetically isolated from said elongate casing;

a first magnetic pole means extending contiguous to but axially spaced from one end of said armature and thereby forming a gap between said first pole and the one end of said armature;

a second magnetic pole means extending contiguous to but spaced from the other end of said armature and thereby forming a gap between said second pole and the other end of said armature;

push rod means connected to said armature and projecting axially outwardly from said casing for performing work, wherein electrical excitation of said electromagnetic coil in either direction will produce a magnetic flux through said armature which will act in concert with the permanent magnetic flux across the gap between one of said first and second magnetic pole means and an associated end of said armature and concomitantly said electrical excitation of said coil will produce a magnetic flux through said armature which will act in opposition to the permanent magnetic flux across the gap between the other of said first and second magnetic pole means and an associated end of said armature to induce movement of said armature and said pushrod means in the direction of cooperative permanent magnetic and electromagnetic flux to a degree proportional with the current passing through said coil.

2. An electromechanical force motor as defined in claim 1 wherein said first and second annular permanent magnet means each comprise:

permanent magnets having poles which are axially oriented within said housing and wherein like poles are positioned adjacent to opposing ends of said annular electromagnetic coil.

3. An electromechanical force motor as defined in claim 2 and further comprising:

a first spring means coaxially mounted between one end of said armature and said first magnetic pole means; and a second spring means coaxially mounted between the other end of said armature and said second magnetic pole means whereby said armature is biased in a posture axially equidistant between said first and second magnetic pole means.

4. An electromechanical force motor as defined in claim 3 and further comprising:

a diamagnetic sleeve coaxially positioned between said armature and said annular electromagnetic coil and said first and second annular permanent magnetic means and said armature; and bearing means disposed between said armature and said diamagnetic sleeve to facilitate translation of said armature within said diamagnetic sleeve.

5. An electromechanical force motor as defined in claim 4 wherein said bearing means comprises:

a first annular glide ring positioned generally at one end of said armature; and a second annular glide ring positioned at the other end of said armature, wherein said first and second glide rings are fashioned from a material having a lower coefficient of friction than said armature to facilitate translation of said armature within said sleeve.

6. An electromechanical force motor as defined in claim 4 wherein said bearing means comprises:

a first annular groove fashioned within one of said armature and said concentric sleeve generally at a first end thereof and having a plurality of ball bearings positioned therein; and a second annular groove positioned within one of said armature and said concentric sleeve generally at a second end of said armature and having positioned therein a plurality of ball bearings to facilitate translation of said armature within said sleeve.

7. An electromechanical force motor as defined in claim 4 and further comprising:

an axial passage extending coaxially through said pushrod means connected to said armature and said armature for permitting ambient fluid surrounding said elongate magnetic casing to enter into the interior of said casing.

8. An electromechanical force motor as defined in claim 7 and further comprising:

a radial aperture formed in said pushrod at the outwardly projecting end thereof to permit ambient fluid to freely enter into said axial passage extending through said pushrod and said armature.

9. An electromechanical force motor as defined in claim 2 and further comprising:

an axial passage extending coaxially through said pushrod means connected to said armature and said armature for permitting ambient fluid surrounding said elongate magnetic casing to enter into the interior of said casing.

10. An electromechanical force motor as defined in claim 1 and further comprising:

a diamagnetic sleeve coaxially positioned between said armature and said annular electromagnetic coil and said armature and said first and second annular permanent magnetic means; and bearing means disposed between said armature and said diamagnetic sleeve to facilitate translation of said armature within said diamagnetic sleeve.

11. An electromechanical force motor as defined in claim 10 wherein said bearing means comprises:

a first annular glide ring positioned generally at one end of said armature; and a second annular glide ring positioned at the other end of said armature, wherein said first and second glide rings are fashioned from a material having a lower coefficient of friction than said armature to facilitate translation of said armature within said sleeve.

12. An electromechanical force motor as defined in claim 10 wherein said bearing means comprises:

a first annular groove fashioned within one of said armature and said concentric sleeve generally at a first end thereof and having a plurality of ball bearings positioned therein; and a second annular groove positioned within one of said armature and said concentric sleeve generally at a second end of said armature and having positioned therein a plurality of ball bearings to facilitate translation of said armature within said sleeve.

13. An electromechanical force motor as defined in claim 1 and further comprising:

an axial passage extending coaxially through said pushrod means connected to said armature and said armature for permitting ambient fluid surrounding said elongate magnetic casing to enter into the interior of said casing.

14. An electromechanical force motor as defined in claim 13 and further comprising:

a radial aperture formed in said pushrod at the outwardly projecting end thereof to permit ambient fluid to freely enter into said axial passage extending through said pushrod and said armature.

15. An electromechanical force motor as defined in claim 1 and further comprising:

a diamagnetic sleeve coaxially positioned between said armature and said annular electromagnetic coil and being welded at the ends thereof to said first and second magnetic pole means to form a unitized central core for enhousing said armature and isolating fluid contained therein from said surrounding electromagnetic coil.

* * * * *